United States Patent [19]

Johnston

[11] Patent Number: 4,479,053
[45] Date of Patent: Oct. 23, 1984

[54] FOCAL PLANE ARRAY OPTICAL PROXIMITY SENSOR

[75] Inventor: Alan R. Johnston, La Canada, Calif.

[73] Assignee: The United States of America as represented by the Administrator of the National Aeronautics and Space Administration, Washington, D.C.

[21] Appl. No.: 242,797

[22] Filed: Mar. 11, 1981

[51] Int. Cl.³ ............................................. G01S 9/02
[52] U.S. Cl. ................................... 250/221; 340/555
[58] Field of Search ............... 250/221, 222; 340/555, 340/556, 557; 356/1, 4

[56] References Cited

U.S. PATENT DOCUMENTS

| | | | |
|---|---|---|---|
| 3,226,673 | 12/1965 | Cudworth | 340/31 |
| 3,582,933 | 6/1971 | Place | 340/258 |
| 3,683,379 | 8/1972 | Saddler et al. | 343/7 ED |
| 3,749,197 | 7/1973 | Deutsch | 180/98 |
| 3,778,823 | 12/1973 | Sato et al. | 343/7 ED |
| 3,921,749 | 11/1975 | Kawada | 180/98 |
| 4,039,782 | 8/1977 | Burckhardt et al. | 235/150.2 |
| 4,102,426 | 7/1978 | Walden | 180/98 |

Primary Examiner—David C. Nelms
Assistant Examiner—Darwin R. Hostetter
Attorney, Agent, or Firm—M. Mott; J. Manning; T. Jones

[57] ABSTRACT

An optical proximity sensor for optically detecting an object within a predetermined detection volume. More specifically, an optical proximity sensor is disclosed having an illuminator assembly including an illuminator lens (55) and a plurality of light-emitting diodes (53) located at first predetermined positions along the focal plane (54) of the illuminator lens (55). A detector assembly including a detector lens (65) and a plurality of photodiodes (60) located at second predetermined positions along the focal plane of the detector lens (65) is also provided. The two lenses are spaced apart a predetermined distance in accordance with the configuration of the light-emitting diodes (53) and the photodiodes (60) in order to define a predetermined detection volume. Each light-emitting diode has a corresponding photodiode, and their relative positions on their respective focal planes determine the detection volume defined by their overlapping fields of view. Thus by correctly positioning one light-emitting diode/photodiode pair with respect to each other, all the other pairs will be correctly positioned due to their predetermined locations on their respective focal planes. Additionally, a combination of optical proximity sensors, according to the invention, is disclosed wherein the sensors can be used in conjunction with a vehicle to provide a safety system for warning an operator when an object is within a volume defined by the proximity sensor combination.

13 Claims, 12 Drawing Figures

FOCAL PLANE ARRAY OPTICAL PROXIMITY SENSOR

ORIGIN OF INVENTION

The invention described herein was made in the performance of work under a NASA contract and is subject to the provisions of Section 305 of the National Aeronautics and Space act of 1958, Public Law 85-568 (72 Stat. 435; 42 USC 2457).

FIELD OF THE INVENTION

The invention relates to proximity sensors and more particularly to optical proximity sensors wherein an object with a predetermined volume can be optically detected.

BACKGROUND OF THE INVENTION

A conventional optical proximity sensor includes a single light-emitting source such as a light-emitting diode and a light-detecting device such as a photodiode. The light-emitting diode is frequently placed at the focal point of a projector or illuminator lens so that it projects a beam of light having a field of view determined by the characteristics of the illuminator lens. The photodiode is placed at the focal point of a detector lens so that it has a detection field of view that intersects the light-emitting diode field of view to define a predetermined detection volume. Light reflected from an object in the detection volume is sensed by the photodiode and indicates that an object is within the volume defined by the intersecting fields of view. As can be appreciated, in order for a well defined detection volume to be obtained, the field of view of the light-emitting diode and the photodiode must have a fairly small angle. In addition, their fields of view must be restricted in order to facilitate separating the light emitting diode signal from background sunlight. However, the smaller the field of view of the light-emitting diode, the more light-emitting diode/photodiode pairs or combinations are required in order to define a desired detection volume. In theory, there is no problem with increasing the number of light-emitting diode/photodiode combinations; however, as a practical matter, the more combinations there are, the more difficult it is to align each combination with respect to all the other combinations. These adjustments are very time consuming and significantly add to the operating cost of arrays utilizing multiple proximity sensors.

SUMMARY OF THE INVENTION

The present invention solves the above problem by utilizing a focal plane array for both the light-emitting devices and the light-detecting devices. It provides an optical proximity sensor which includes an illuminator assembly having an illuminator lens and a plurality of light emitters located at first predetermined positions within the focal plane of the illuminator lens, and a detector assembly including a detector lens and a plurality of light detectors located at second predetermined positions within the focal plane of the detector lens. Also included is a means for positioning the detector lens with respect to the illuninator lens so that the field of view of each of the light emitters through their associated illuminator lens will intersect the field of view of at least one of a corresponding light detector through its associated detector lens.

In a specific embodiment disclosed, the light emitters are light-emitting diodes and the light detectors are photodiodes. There is a photodiode for each light-emitting diode, and each photodiode is located on the detector lens focal plane so that it intersects the field of view of its associated light-emitting diode to define a predetermined detection volume. By appropriately positioning each light-emitting diode-photodiode pair on their respective focal planes, and appropriately positioning their lens assemblies with respect to each other, any desired volume can be defined in which an object is to be detected. An optical proximity sensor according to the invention is especially adaptable for use as an object detector for a vehicle. An advantage is that multiple adjustments are not necessary because when one light-emitting diode/photodiode combination is properly adjusted, all the other combinations are also properly adjusted due to their predetermined locations on their respective focal planes, thus eliminating the need for multiple adjustments as required in conventional systems.

DESCRIPTION OF PREFERRED EMBODIMENTS

Detailed illustrative embodiments of the invention are disclosed herein. These embodiments exemplify the invention and are currently considered to be the best embodiments for such purpose. However, it is to be recognized that the specific embodiments disclosed are only representative in providing a basis for the claims which define the scope of the present invention.

In accordance with the present invention, an optical proximity sensor is disclosed having an illuminator assembly which includes an illuminator lens and a plurality of light-emitting diodes located at predetermined locations within the illuminator lens focal plane. A detector assembly includes a detector lens and a plurality of photodiodes which are located at second predetermined locations within the detector lens focal plane. The two assemblies are positioned with respect to each other so that the fields of view of each light emitter intersects the field of view of its corresponding light detector. Overlapping regions of the two fields of view define a region in which light refelcted from an object is detectable by the light detectors, provided, of course, that the light intensity reflected to the detector is above its threshold detection sensitivity. Predetermined configurations of the light emitters and light detectors on their respective focal planes define predetermined detection volumes in which any object having a predetermined reflectivity can be detected. Thus, an easily adjustable proximity sensor defining a relatively large volumetric region is provided. The sensor has a characteristic that when one particular light-emitting diode and its associated light detector are properly aligned, all the other light-emitting diodes and their associated detectors are also properly aligned because of their predetermined positions within their respective focal planes.

Figure 1:
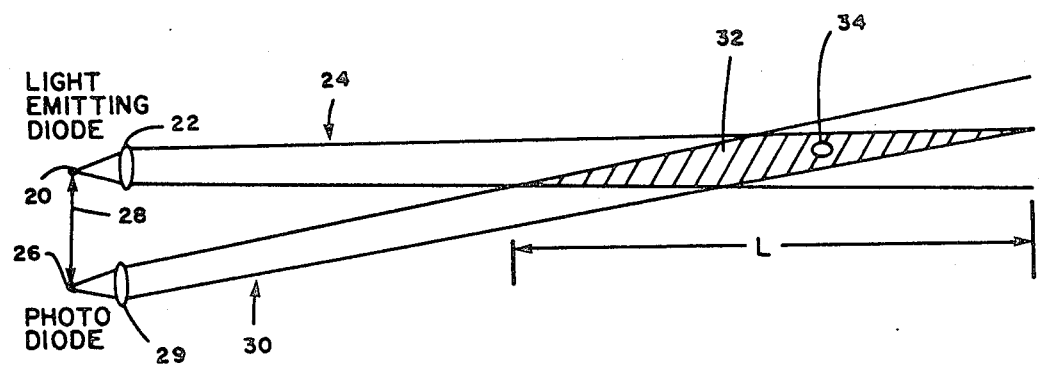
FIG. 1 is a diagram showing intersecting fields of view of one light-emitting diode and one photodiode detector when utilized as an optical proximity sensor.

Referring now to FIG. 1, a light-emitting diode 20 and an associated illuminator lens 22 provide a light beam 24 having a field of view determined by the characteristics of the lens 22 and the diode 20. Similarly, a light-detecting photodiode 26 is positioned a predetermined distance 28 from the light-emitting diode 20. The photodiode 26 and an associated detector lens 29 provide a light beam 30 having a field of view determined by the characteristics of the photodiode 26 and the detector lens 29. The fields of view of the light-emitting diode 20 and the photodiode 26 intersect in the cross hatched region or detection volume shown at 32. Thus, a reflecting object 34 within the cross hatched region 32 is within the field of view of both the light-emitting diode 20 and the photodiode 26. If the intensity of the light emitting diode 20 is sufficiently great, or if the reflectivity of the object 34 is sufficiently high, then the object 34 in the cross hatched region 32 will reflect sufficient energy from the light-emitting diode 20 to the photodiode 26 for detection by the photodiode 26 to occur. As can be appreciated, the length L of the detection volume 32 is determined by the two fields of view. Regardless of the intensity of the light emitting diode 20, an object can be detected only when within the length L. As previously explained, this concept is utilized in prior art systems for defining a region in which objects can be detected. The problem with these prior art systems is that each light-emitting diode and photodiode combination has to be individually adjusted in order to define a predetermined detection volume. These adjustments are time consuming and subject to error. As will be explained below, locating a plurality of light-emitting diodes and a plurality of photodiodes on the focal planes of their respective lenses allows each to be automatically adjusted with respect to the other when only one is adjusted with respect to the other.

Figure 2:
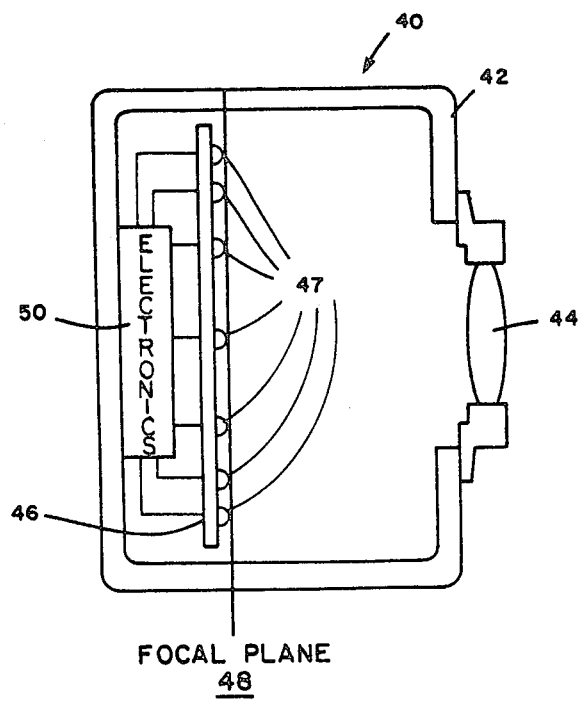
FIG. 2 is a cross-sectional view of a lens and diode assembly to be used in an optical proximity sensor provided by the invention.

FIG. 2 shows an assembly 40 which could be an illuminator assembly or a detector assembly. The assembly 40 includes a housing 42 and a lens 44 which is chosen to provide a predetermined field of view. The assembly 40 includes a mounting plate 46 for mounting a plurality of diodes 47 such that their emitting or detecting surfaces lie within the focal plane 48 of the lens 44. An electronic processing unit 50 is also provided. If the assembly 40 contained light-emitting diodes, then it is designated an illuminator assembly and the electronics unit provides power necessary to cause the diodes to emit light. If the assembly 40 contained light detectors such as photodiodes, then it is designated as a detector assembly and the electronics unit 50 is connected to each of the diodes and is configured to provide an output signal related to the light detected by each detector.

Figure 4:
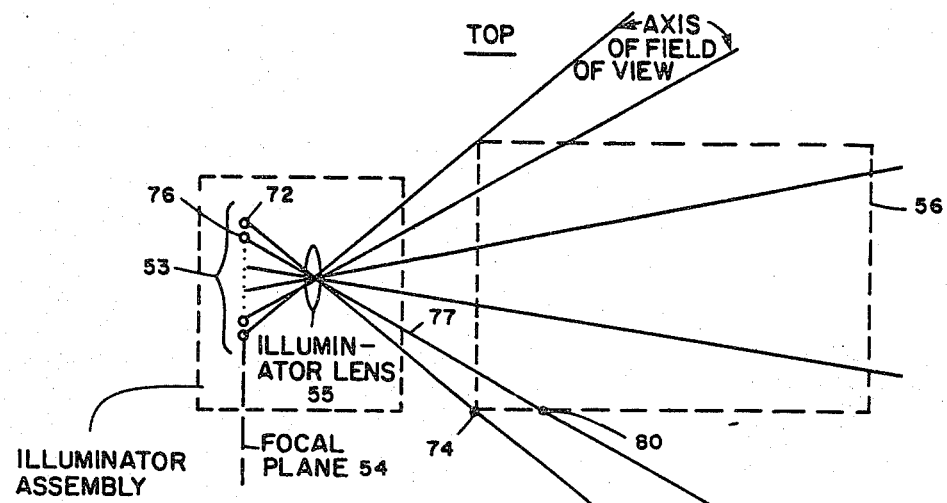
FIG. 4 is a top view of an illumination pattern obtained with the light-emitting diode configuration of FIG. 3.
Figure 3:
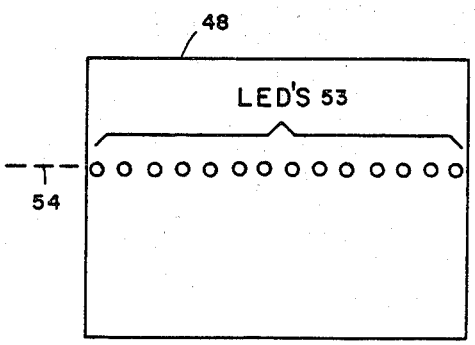
FIG. 3 is a diagram showing an arrangement of light-emitting diodes to be configured along the focal plane of the lens assembly of FIG. 2.

Referring now to FIG. 3, one configuration of light-emitting diodes (LED's) 53 within the focal plane 48 is shown. Here, light emitting diodes 53 are located along a horizontal line 54 in order to provide a fan-shaped light output beam. Referring to FIG. 4, the light-emitting diodes 53 are positioned with respect to an illuminator lens 55 so their axes have fields of view as shown. As will be explained in further detail below, the dotted lines 56 indicate the limits of a volumetric region in which it is desired to detect the presence of an object.

Figure 6:
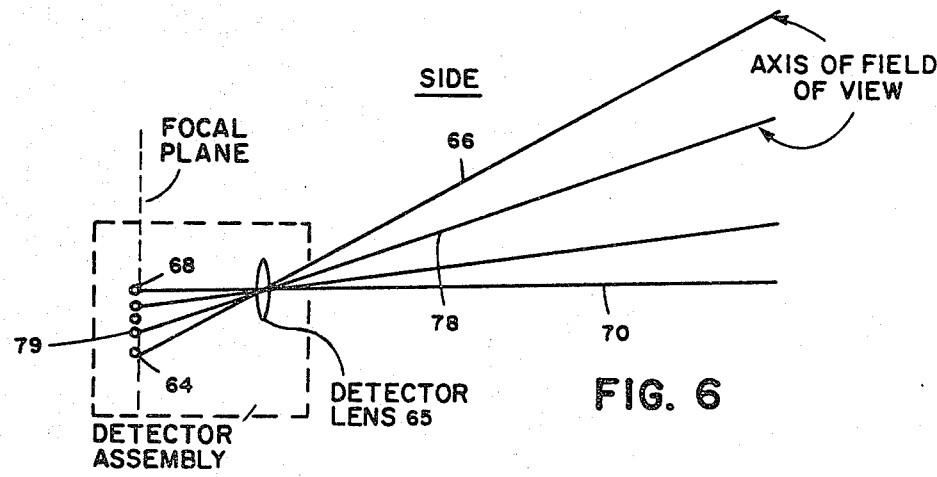
FIG. 6 is a side view of a detection pattern obtainable with the photodiode configuration of FIG. 5.
Figure 5:
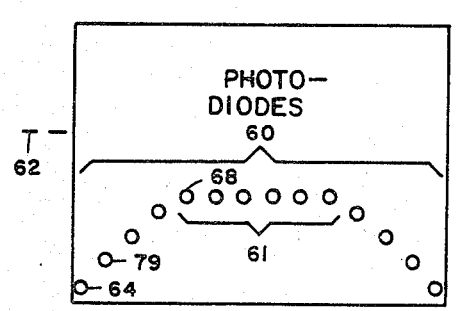
FIG. 5 is a diagram showing an arrangement of photodiodes in the detector assembly focal plane to be utilized in an exemplary embodiment of the invention.

If the assembly is to be configured as a detector assembly, photodiodes 60 could be arranged as shown in FIG. 5, each photodiode corresponding to one of the light-emitting diodes 53 shown in FIG. 3. The photodiodes 60 are positioned so that those in a central section 61 are slightly below the focal plane center as shown at 62, and and those on either side of the central section 61 are disposed along lines that extend toward each corner. Thus photodiode 64 has a field of view axis through the detector lens 65 as shown in FIG. 6 at 66, this axis defining a greater angle with respect to the horizontal than that of photodiode 68 having a field of view axis shown at 70. The field of view axis 66 of photodiode 64 is located so that it intersects the field of view axis of light-emitting diode 72 at a point indicated at 74 in FIG. 4. Similarly, light-emitting diode 76 has a field of view axis 77 that intersects the field of view axis 78 of photodiode 79 at point 80 as shown in FIG. 4. Thus it can be appreciated that the configuration of light-emitting diodes shown in FIG. 3 and photodiodes shown in FIG. 5 can be located on their respective focal planes to define any volumetric region desired. The number of photodiodes 60 corresponds to the number of light-emitting diodes 53, the field of view of each photodiode being chosen to intersect the field of view of its corresponding light-emitting diode at a predetermined spatial location. As can be appreciated by referring to FIGS. 5 and 6, the location of each of the photodiodes can be chosen so that their fields of view will intersect the fields of view of the light-emitting diodes to define a horizontally oriented volumetric region.

Figure 7:
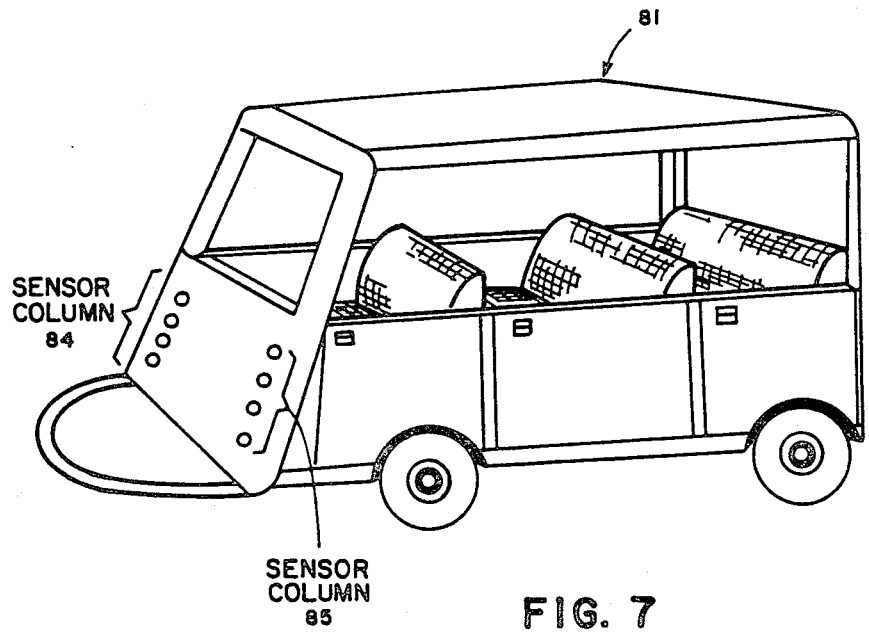
FIG. 7 is a perspective view of a vehicle utilizing four proximity sensor assemblies provided by the invention.
Figure 8:
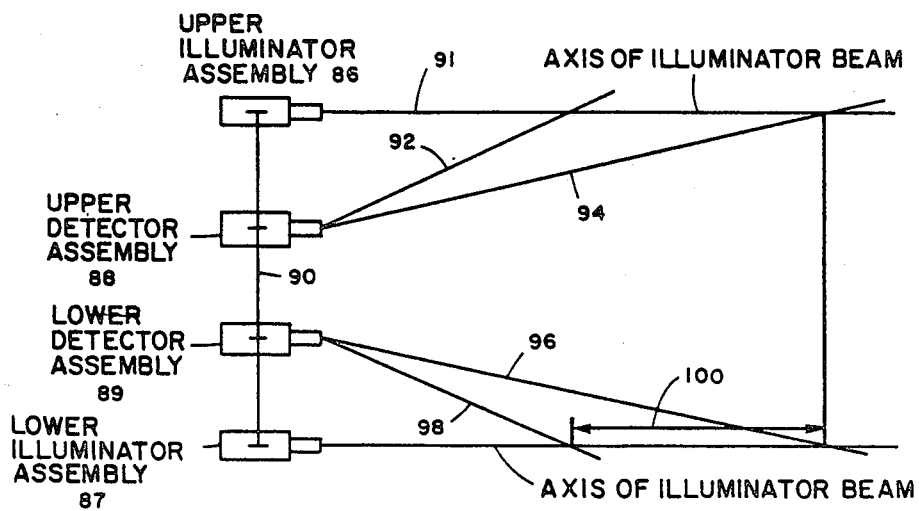
FIG. 8 shows one column containing two of the proximity sensors shown in FIG. 7.
Figure 10:
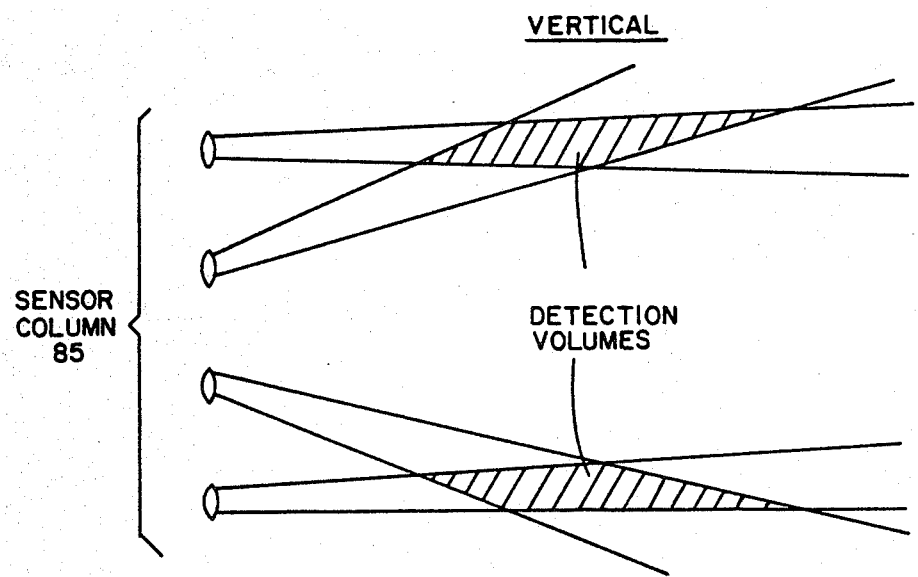
FIG. 10 shows vertical coverage obtainable with the four proximity sensors shown in FIG. 7.
Figure 9:
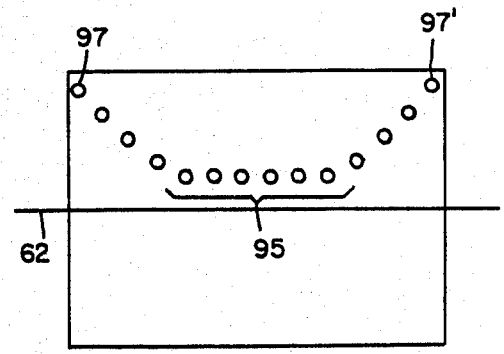
FIG. 9 shows another photodiode configuration utilized in an exemplary embodiment of the invention.
Figure 11:
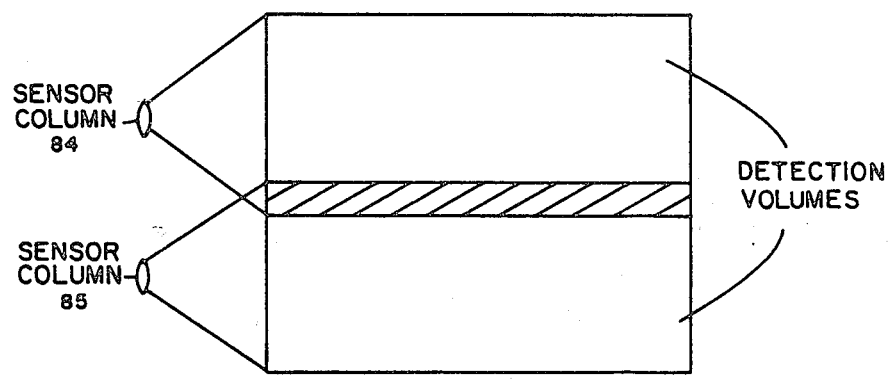
FIG. 11 shows horizontal coverage obtainable with the four proximity sensors shown in FIG. 7.

FIG. 7 shows a vehicle 81 equipped with the proximity sensors described above. The particular configuration shown has two sensor columns 84 and 85. Referring to FIG. 8, each sensor column 84 or 85 contains an upper illuminator assembly 86, a lower illuminator assembly 87, an upper detector assembly 88 and a lower detector assembly 89. The assemblies are positioned with respect to each other by a holding structure 90, which could be a frame of the vehicle shown in FIG. 7. The axis of the upper illuminator assembly 86 is shown at 91. The upper detector assembly 88 is positioned so that the field of view of its lowest photodiode 64, as shown in FIGS. 5 and 6, has an optical axis shown at 92. The field of view axis 94 of the highest photodiode 68 is shown at 94. Similarly, it can be appreciated that if the photodiode configuration shown in FIG. 5 were reversed as shown in FIG. 9, then the horizontally oriented photodiodes 95 would have a field of view axis shown at 96, and photodiodes 97 and 97' closest to the upper corners of the focal plane would have fields of view axes shown at 98. Thus, the length of the detection volume is related to the distance shown at 100 in FIG. 8. The thickness of the detection volume is a function of the angular field of view associated with each individual photodiode and each individual light-emitting diode. The proximity detectors shown in FIG. 8, when located as shown in the vehicle 81 of FIG. 7, provide detection volumes shown in FIGS. 10 and 11. Thus as can be appreciated, proximity sensors provided by the invention when utilized in the vehicle shown in FIG. 7 can be completely adjusted with only four adjustments, each illuminator assembly and detector assembly pair relationship being the only adjustment required.

Figure 12:
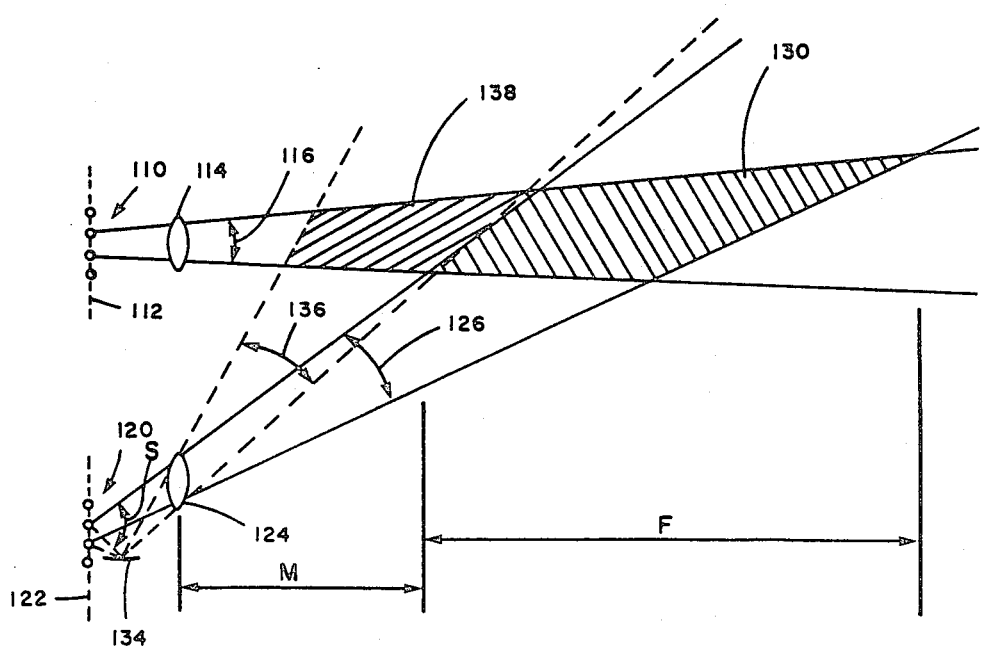
FIG. 12 shows a detection pattern of a further embodiment of the invention utilizing an auxiliary mirror in the detector assembly.

A further embodiment of the invention can be seen in FIG. 12. An array of light-emitting diodes 110 is mounted on the focal plane 112 of an illuminator lens 114 providing a field of view of the array 110 shown at 116. Similarly, an array of photodiodes 120 is mounted on the focal plane 122 of a detector lens 124 providing a field of view of the array 120 shown at 126. Overlapping portions of these fields of view define a detection volume 130 which has a minimum detection range M and a depth of field F. In order to maintain a maximum detection range of M+F, and a minimum detection range less than M, an auxiliary mirror 134 is positioned with respect to the photodiode array 120 to provide an additional field of view 136. This increases the detection volume by an amount shown at 138. Thus the auxiliary mirror 134 allows the detection range to be significantly extended while maintaining the field of view 126 characteristics of the direct photodiode 120/lens 124 combination within the detection volume 130. Of course, this embodiment requires use of a photodiode that is sensitive to light over an angular range S shown in FIG. 12. It should also be recognized that an auxiliary mirror could have been appropriately placed adjacent to the light-emitting diode array 110 in order to extend the detection volume along the photodiode field of view 126.

Although light-emitting diodes and photodiodes have been used in the exemplary embodiment, other types of light-emitting devices and light-detecting devices could also be utilized. Additionally, the photodiodes could have been positioned horizontally in the detector lens focal plane and the light-emitting diodes positioned as shown in FIG. 5 to define the volumetric detection region. Thus, an optical proximity sensor, according to the present invention, needs only one adjustment of a single light-emitting device with respect to its corresponding light-detecting device in order to insure that all light-emitting devices and light-detecting devices in the proximity sensor are adjusted.

What is claimed is:

1. In an optical proximity sensor mounted on a vehicle, the combination of
   an illuminator assembly comprising an illuminator lens and an array of light emitters in the focal plane of said illuminator lens;
   a detector assembly comprising a detector lens and an array of light detectors in the focal plane of said detectors lens; and
   means for so positioning said detector assembly and said illuminator assembly with respect to each other on said vehicle that the field of view of each of said light emitters through said illuminator lens will intersect the field of view of at least one of said light detectors through said detector lens.

2. The sensor of claim 1 wherein said light emitters comprise light-emitting diodes and said light detectors comprise detectors responsive to light output of said light-emitting diodes.

3. The sensor of claim 1 wherein said light emitters and said light detectors are positioned in their respective focal planes to define a predetermined volume in which an object having a characteristic reflectivity can be detected.

4. The optical sensor of claim 3 comprising four illuminator assemblies and four detector assemblies positioned in two columns, each column having two illuminator assemblies and two detector assemblies positioned so that each illuminator assembly is adjacent to a detector assembly.

5. The sensor of claim 1 wherein said detector assembly comprises an auxiliary reflection means for increasing the field of view of said light detectors through said detector lens.

6. The sensor of claim 1 wherein said illuminator assembly comprises an auxiliary reflection means for increasing the field of view of said light emitters through said illuminator lens.

7. An optical proximity sensor comprising:
   an illuminator lens;
   means for mounting a plurality of light emitters at predetermined positions in the focal plane of said illuminator lens;
   a detector lens;
   means for mounting a plurality of light detectors at predetermined positions in the focal plane of said detector lens, one of said light detectors corresponding to each of said light emitters, said light detector predetermined positions being chosen so that their fields of view through said detector lens are capable of intersecting the fields of view of their corresponding light emitters through said illuminator lens; and
   means for positioning said illuminator and detector lenses so that the fields of view of corresponding light detectors and light emitters will intersect each other.

8. The proximity sensor of claim 7 wherein said light emitters are light-emitting diodes and said light detectors are photodiodes.

9. The proximity sensor of claim 7 further comprising a detector auxiliary reflection means for increasing the field of view of said light detectors through said detector lens.

10. The proximity sensor of claim 7 further comprising an illuminator auxiliary reflection means for increasing the field of view of said light emitters through said illuminator lens.

11. A method for optically sensing an object comprising the steps of:
   locating a plurality of light emitters at predetermined positions in the focal plane of an illuminator lens;
   locating a plurality of light detectors at predetermined positions in the focal plane of a detector lens, each light detector corresponding to a light emitter, said predetermined positions being chosen so that when the field of view of one light detector or intersects the field of view of its associated light emitter at a predetermined location, the fields of view of the other light detectors will intersect the fields of view of their associated light emitters at predetermined locations; and
   positioning said illuminator lens and said detector lens with respect to each other so that one of said light detector's fields of view intersects its associated light emitter field of view at its predetermined location.

12. The method of claim 11 further comprising the step of locating an auxiliary reflection means adjacent to said light emitters for increasing the field of view of said light emitters through said illuminator lens.

13. The method of claim 11 further comprising the step of locating an auxiliary reflection means adjacent to said light detectors for increasing the field of view of said light detectors through said detector lens.

* * * * *